(12) United States Patent
Barr et al.

(10) Patent No.: US 7,753,313 B1
(45) Date of Patent: Jul. 13, 2010

(54) COMPOSITE WING SLAT FOR AIRCRAFT

(75) Inventors: Mark A. Barr, Seattle, WA (US); Jeffrey P Baucum, Sammamish, WA (US)

(73) Assignee: The Boeing Company, Chicago, IL (US)

( * ) Notice: Subject to any disclaimer, the term of this patent is extended or adjusted under 35 U.S.C. 154(b) by 923 days.

(21) Appl. No.: 11/523,327

(22) Filed: Sep. 19, 2006

(51) Int. Cl.
*B64C 3/18* (2006.01)
*B64C 3/20* (2006.01)

(52) U.S. Cl. .................. 244/123.1; 244/123.5

(58) Field of Classification Search ............. 244/123.1, 244/123.13, 123.14, 211–213, 215, 131
See application file for complete search history.

(56) References Cited

U.S. PATENT DOCUMENTS

| | | | | |
|---|---|---|---|---|
| 2,857,662 A | * | 10/1958 | Grainger | 29/449 |
| 3,140,066 A | * | 7/1964 | Sutton et al. | 244/215 |
| 4,471,928 A | * | 9/1984 | Cole | 244/215 |
| 4,657,615 A | * | 4/1987 | Braun et al. | 156/245 |
| 5,224,670 A | * | 7/1993 | Padden | 244/123.3 |
| 6,234,423 B1 | * | 5/2001 | Hirahara et al. | 244/123.7 |
| 6,659,394 B1 | * | 12/2003 | Shenk | 244/7 C |

FOREIGN PATENT DOCUMENTS

WO 2007/018188 8/2007

* cited by examiner

*Primary Examiner*—Tien Dinh
(74) *Attorney, Agent, or Firm*—Tung & Associates

(57) ABSTRACT

An aircraft wing slat is formed from composite materials using lay-up and vacuum bagging techniques. The slat lay-up comprises a central honeycomb core sandwiched between upper and lower composite skins, a pre-cured spar and pre-cured stiffeners. After the lay-up is cured and removed from a lay-up mold, leading edge strengthening ribs and a preformed composite nose skin are installed to complete the slat.

22 Claims, 5 Drawing Sheets

COMPOSITE WING SLAT FOR AIRCRAFT

BACKGROUND OF THE INVENTION

1. Field of the Invention

The present invention generally relates to structural components for aircraft, and deals more particularly with a wing slat formed of composite materials.

2. Description of the Related Art

In order to improve the lift characteristics of large commercial and military aircraft, particularly during low speed operation, wings are equipped with high lift, auxiliary devices known as slats. The slats are mounted on the leading edge of the wings so as to pivot or slide outwardly from the leading edge, from a stowed to a deployed position. Typically, leading edge slats are moved downward and forward from the leading edge of the wing using either linear or rotary actuators which move a track or an arm attached to the slat.

In the past, slats have been fabricated using metal and metal alloys using metal-to-metal bonds. Metallic slats suffer from a number of shortcomings, including metal bonding problems which contribute to in-service maintenance, impact damage and corrosion. In addition, metallic slats are fabricated from numerous metal components which must be individually manufactured and assembled, making the slats relatively expensive to manufacture, and adding unnecessary weight to the aircraft.

Accordingly, there is a need for a wing slat construction having a reduced number of parts which is also lighter in weight. The present invention is directed towards satisfying this need.

BRIEF SUMMARY OF THE INVENTION

In accordance with one aspect of the invention, a wing slat for aircraft comprises an upper, pre-cured composite skin, a lower composite skin, and a central, honeycomb core section sandwiched between the upper and lower skins. A composite spar having a C-shaped cross section is bonded to the upper and lower skins at the forward end of the central core section. A plurality of composite stiffeners are bonded to a curved forward section of the lower skin, and a composite nose skin forming the leading edge of the slat connects the leading edges of the upper and lower skins.

In accordance with another aspect of the invention, a composite slat for an aircraft wing, comprises an upper composite skin, a central, wedge shaped composite core, a lower composite skin having a curved forward edge, a spar between the upper and lower skins forward of the composite core, and composite stiffeners bonded to the curved forward edge of the lower skin. The spar is bonded to the upper skin, lower skin, and the central core, which preferably comprises a honeycomb material. The stiffeners are curved and spaced apart along the length of the slat. A composite nose skin forming the leading edge of the slat connects the leading edges of the upper and lower skins. The nose skin is strengthened by a plurality of ribs which support the nose skin and bear against the lower skin.

In accordance with still another aspect of the invention, a method is provided for fabricating a composite wing slat for an aircraft, comprising the steps of forming a lay-up, compressing the lay-up, and curing the compressed lay-up. The lay-up is formed by placing an upper composite skin in a lay-up mold, placing a composite spar in the mold over a section of the upper skin, and laying an upper composite skin over the combination of the lower skin and the spar. The lay-up step also includes forming a central core of the slat by introducing a preformed composite member into the lay-up mold, following which a procured composite lower skin is placed into the mold covering the combination of the spar and the central core. The lay-up is preferably compressed using vacuum bagging techniques. Following curing, a composite nose skin forms the leading edge of the slat is installed on the cured lay-up.

In accordance with still a further aspect of the invention, a method is provided for fabricating a composite wing slat, comprising the steps of: forming a lay-up in the mold, wherein the lay-up includes an upper composite skin, a central core and a lower composite skin; compressing the lay-up using a vacuum bagging process; curing the lay-up; and, installing a composite nose skin on the cured lay-up. The lay-up process includes placing stiffeners in the mold beneath the upper skin. A composite nose skin is formed by laying up composite material, compressing the nose skin lay-up and curing the nose skin lay-up.

The composite wing slat is advantageous in that it is light weight compared to past metal slats and is fabricated using a reduced number of components. Common production processes can be used to lay-up the components of the slat, and metal to metal bonds are avoided.

These and other features, aspects and advantages of the invention will become better understood with reference to the following drawings, description and claims.

DETAILED DESCRIPTION OF THE INVENTION

Figure 1:
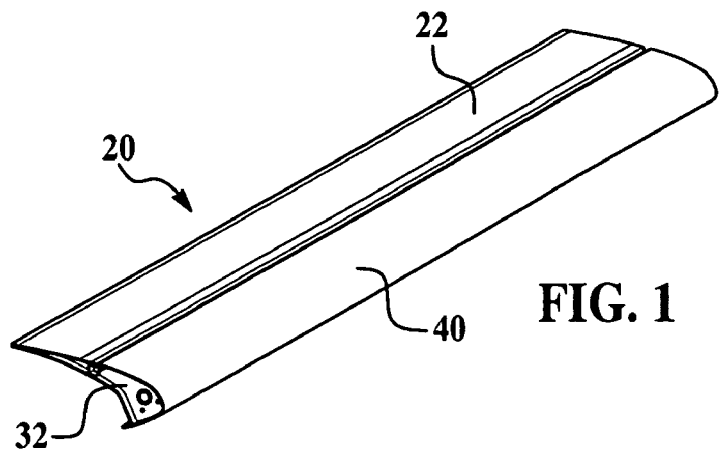
FIG. 1 is a perspective view of a composite slat in accordance with the present invention.
Figure 2:
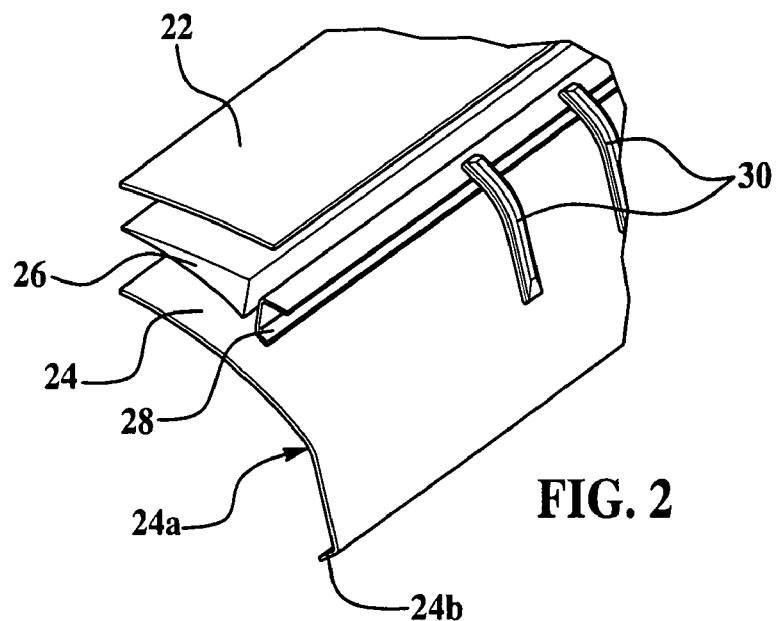
FIG. 2 is an enlarged, exploded perspective view of the slat shown in FIG. 1 with certain parts not shown, for clarity.
Figure 3:
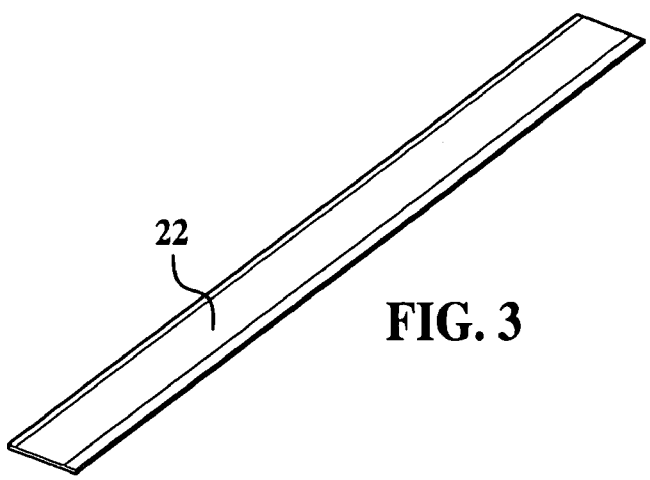
FIG. 3 is a perspective view of the upper skin of the slat shown in FIG. 1.

Referring to the Figures, the present invention broadly relates to an aircraft wing slat 20 formed of composite materials with a minimal number of components. Composite structures and materials are widely used in high performance applications because of their light weight, high strength, high stiffness and superior fatigue resistance. As used herein, "composite materials" refers to materials and structures comprising a combination of dissimilar constituent materials bonded together by a binder, most commonly formed by a thermosetting resin matrix in combination with a fibrous reinforcement such as carbon fiber, typically in the form of a tape, sheet or mat. Multiple plies of the matting are impregnated with a binder such as epoxy plastic resin or polyester resin, and formed into a "lay-up". The plies are arranged so that their respective directions of orientation alternate at differing angles in order to improve the stiffness of the cured laminate. Pressure and heat are applied to the multi-layer part lay-up in order to compress and cure the plies, thereby forming a rigid structure.

The slat 20 broadly comprises an upper composite skin 22, a lower composite skin 24 and a central core section 26 sandwiched between skins 22 and 24. A spar 28, formed of precured composite materials is sandwiched between upper and lower skins 22, 24 respectively, and is bonded to the leading edge of the central foam core 26. The lower skin 24 extends forwardly beyond the upper skin 22 and includes a downwardly curved section 24a that terminates in a trailing edge 24b. A plurality of curved stiffeners 30 formed of composite material extend fore-to-aft and are bonded to the curved section 24a of the lower skin 24. As will be discussed later in more detail, a plurality of longitudinally spaced ribs 32 are secured to the curved section 24a of the lower skin 24, and a composite nose skin piece 40 is received over the ribs 32 to form the leading edge of the slat 20.

The upper skin 22 may comprise a pre-cured composite structure, formed for example, of epoxy pre-impregnated carbon fiber fabric. In one example, five plies of carbon fiber fabric alternately arranged in a 0/45/0/−45/0 orientation were found to be satisfactory. A "doubler" comprising five additional plies of the carbon fiber fabric may be added to the underside of forward sections of the upper skin 22 to increase its strength and rigidity. The upper skin 22 is fabricated using normal lay-up techniques, including vacuum bagging and curing. The trailing edge of the upper skin 22 may be machined so as to possess the desired thickness and taper angle.

The material used to lay-up the lower skin 24 may comprise epoxy pre-impregnated carbon fiber tape and fabric arranged in multiple angles relative to the direction of orientation. The number of plies will vary depending upon the desired stiffness in each area of the skin 24. In one satisfactory example, four plies were found to be satisfactory near the trailing edge of skin 24 while a buildup of ten plies of tape were used in forward portions of the lower skin 24. A doubler of 4 additional plies was added where the skin 24 contacts the ribs 32.

Figure 4:
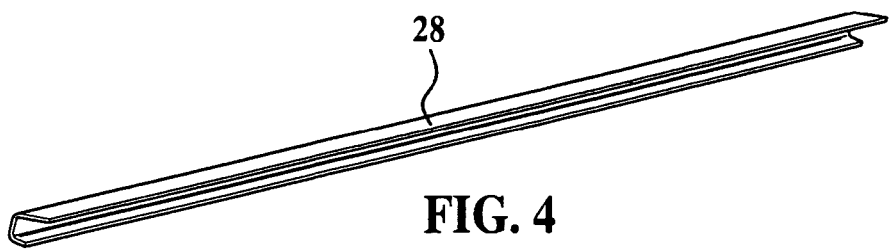
FIG. 4 is a perspective view of a spar.
Figure 5:
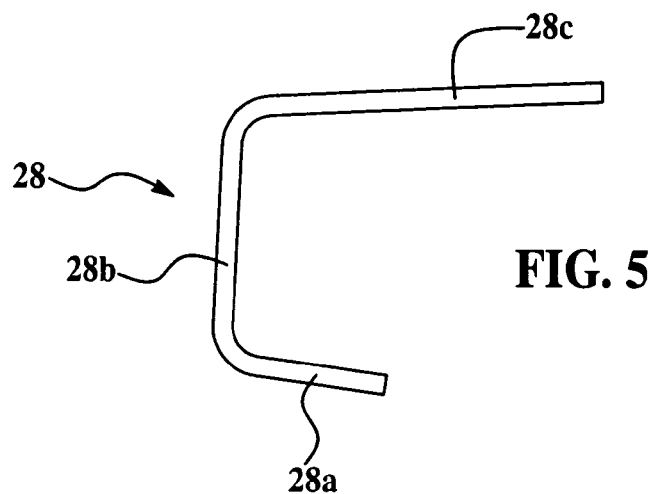
FIG. 5 is an end view of the spar shown in FIG. 4.
Figure 6:
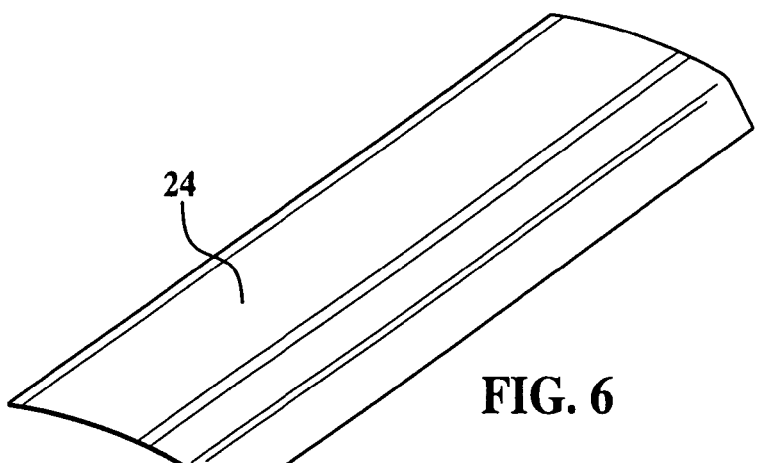
FIG. 6 is a perspective view of the lower skin.
Figure 7:
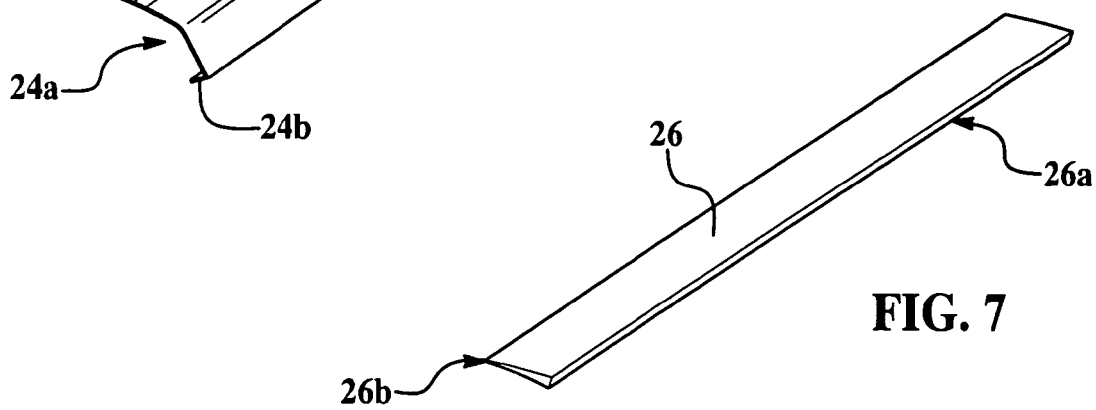
FIG. 7 is a perspective view of the central core.

As best seen in FIGS. 4 and 5, the spar 28 is generally C-shaped in cross section, comprising a lower leg 28a, a middle leg 28b and an upper leg 28c which is wider in width than the lower leg 28a. The spar 28 extends essentially the entire length of the slat 20 and may be formed using conventional lay-up techniques using multiple plies of epoxy pre-impregnated carbon fiber tape. In one embodiment found to be satisfactory, twenty plies of carbon fiber tape were combined with fiberglass plies in the areas contacting the ribs 32, wherein the plies were placed in an alternating arrangement of 45/0/0/−45/90/45/0/0/−45/0 relative to the direction of orientation. The lay-up materials forming the spar may be vacuum bagged to compress the plies, following which the compressed lay-up is cured.

The central core section 26 is wedge shaped in cross section and tapers from leading edge 26a to a trailing edge 26b.

The central core section 26 may be formed from commercially available sheets of either N636 Kevlar® honeycomb or a honeycomb of NOMEX®. NOMEX® is available from the DuPont Corporation and can be formed into a honeycomb using NOMEX® paper which is a form of paper based on Kevlar®. The initial paper honeycomb is usually dipped in a phenolic resin to produce a honeycomb core that exhibits high strength and very good fire resistance. The formed core 26 can be machined to final dimensions as necessary.

The nose skin 40 may comprise a precured laminate of resin impregnated, alternating fiberglass and carbon fiber plies, in tape form, with a heater blanket (not shown) interposed between least two of the plies in order to provide the slat 20 with a deicing capability. The nose skin 49 is attached to the subassembly 45 using countersunk bolts (not shown) or similar "blind" fasteners, which are received on nutplates (not shown) on the subassembly 45.

Figure 8:
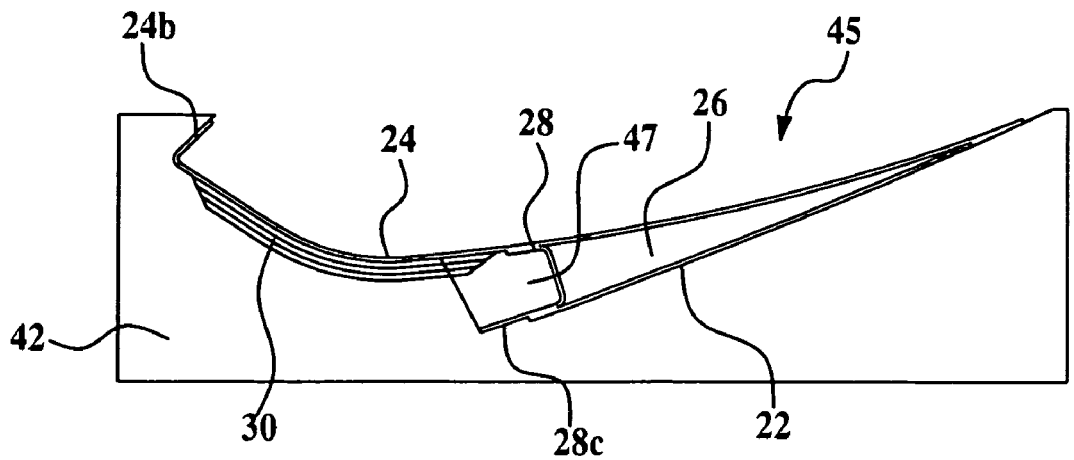
FIG. 8 is a cross sectional view of a lay-up placed in a lay-up mold used in fabricating parts of the slat shown in FIG. 1.
Figure 11:
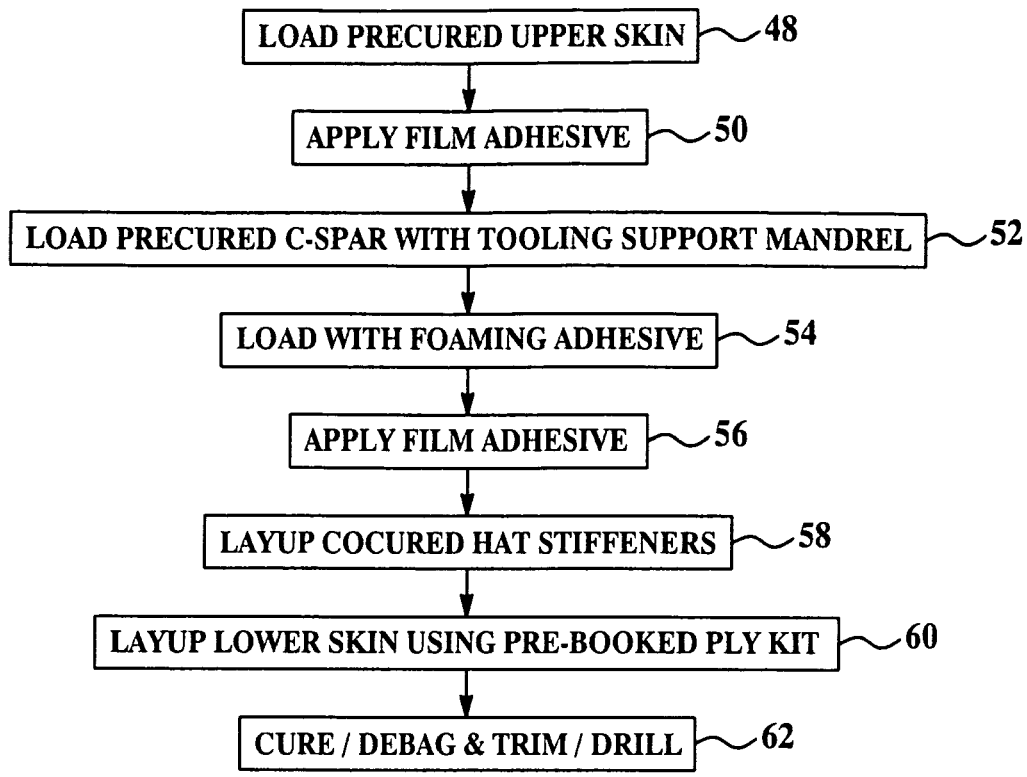
FIG. 11 is a simplified flow diagram of the steps for producing the lay-up shown in FIGS. 8-10.
Figures 12, 13:
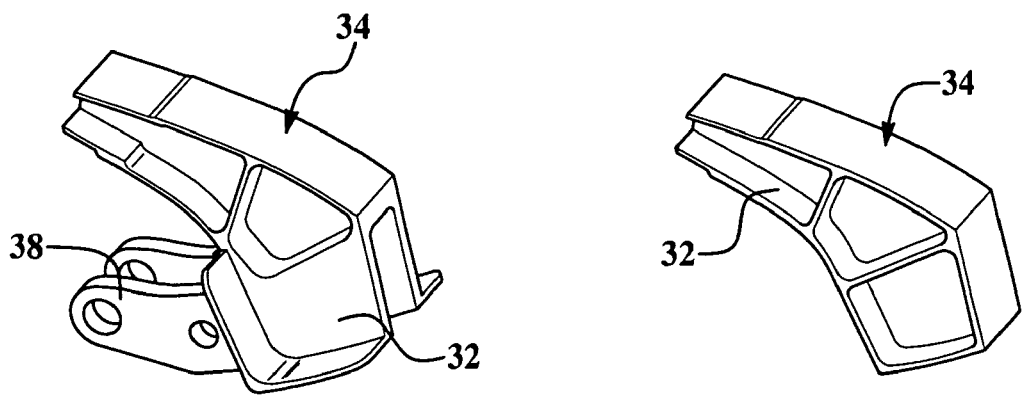
FIGS. 12-14 are perspective views of ribs used in the slat shown in FIG. 1.

Referring now particularly to FIGS. 8 and 11, a composite subassembly 45 is formed by sequentially laying up materials in a lay-up mold 42. Beginning at step 48 in FIG. 11, the precured upper skin 22 is first loaded into the mold 42, following which a film adhesive is applied to the upper side of skin 22, at step 50. At step 52, the pre-cured spar 28 is loaded into the mold 42, so as to be supported by a mandrel portion 47 of the mold 42. As can be seen in FIG. 8, a portion of the leg 28c overlies and contacts the upper skin 22, while leg 28a is positioned on top of the mandrel portion 47 of the mold 42. At step 54, the preformed central core 26 is loaded with a suitable foaming adhesive, following which a film adhesive is applied at 56. At step 58, strips of composite material are laid up in the mold 42 to form the stiffeners 30. Next, at step 60, the lower skin 24 is loaded into mold 42, thereby covering and contacting stiffeners 30, spar 28 and one side of the central core 26. The mold 42 together with the lay-up is placed in a vacuum bag and a vacuum is drawn to compress the components together. Finally, at step 62, the lay-up is cured, causing the lower skin 24 and the stiffeners 30 to co-cure. The vacuum bag is removed and the final subassembly is trimmed and drilled to produce necessary openings for fasteners, as required. A seal (not shown) is installed at the ends of the subassembly 45, between the upper and lower skins 22, 24.

Figure 9:
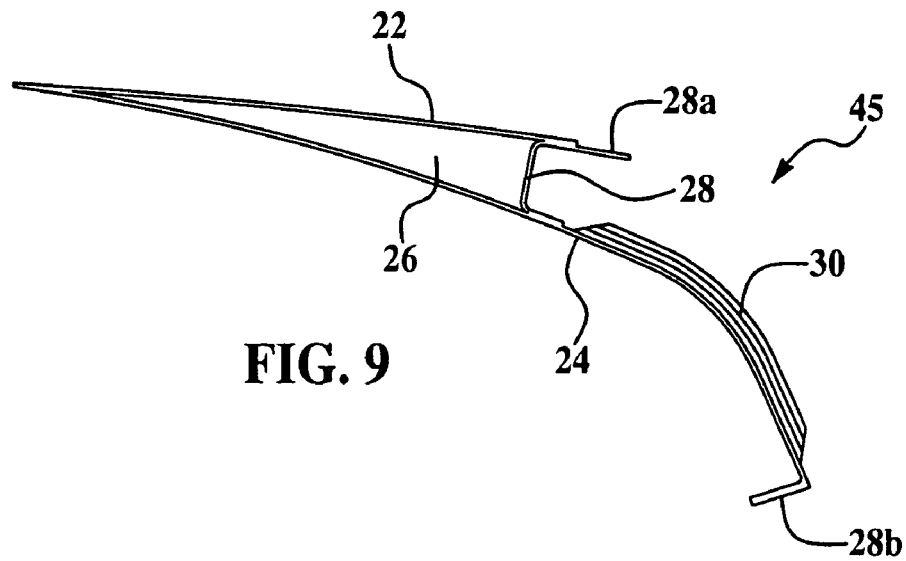
FIG. 9 is a cross sectional view of the lay-up after it has been cured and removed from the lay-up mold shown in FIG. 8.
Figure 10:
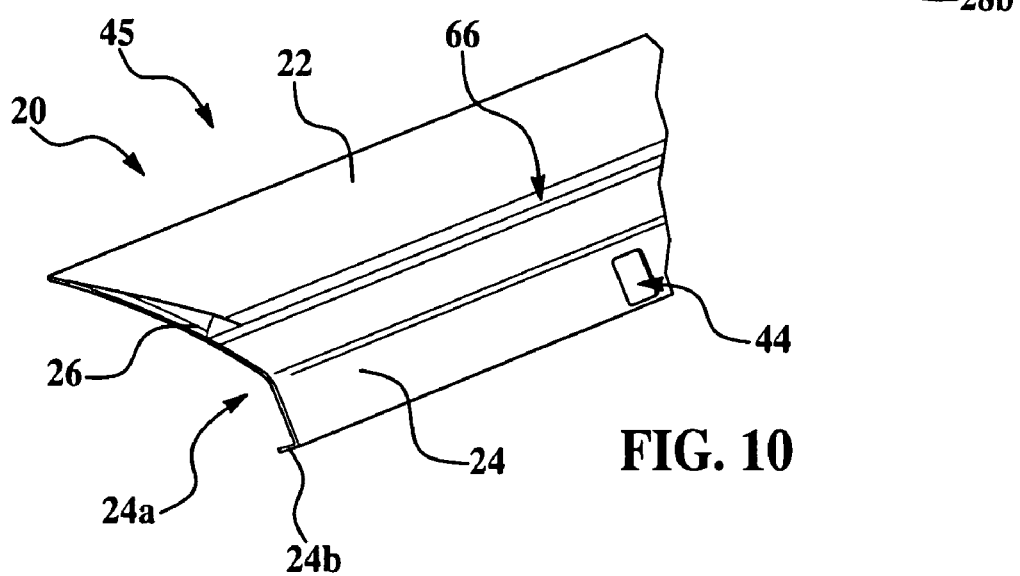
FIG. 10 is a fragmentary, perspective view of a portion of a cured lay-up after it has been removed from the mold shown in FIG. 8.
Figure 14:
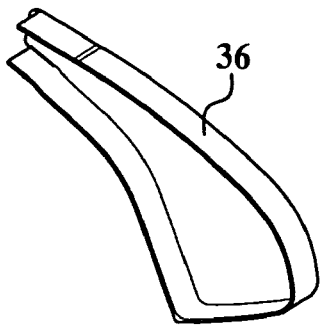
Figure 15:
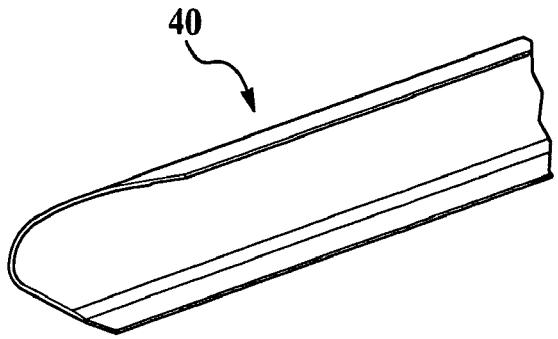
FIG. 15 is a perspective view of a composite nose skin forming part of the slat shown in FIG. 1.
Figure 16:
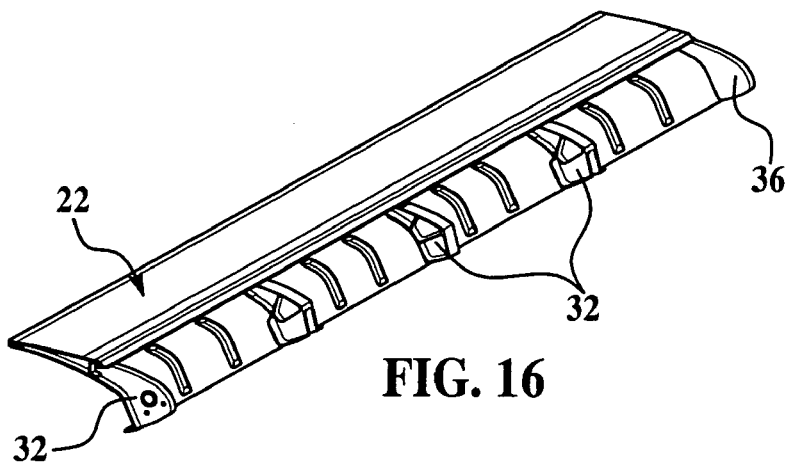
FIG. 16 is a perspective view of a partially assembled slat, showing the positions of the ribs depicted in FIGS. 12-14.
Figure 17:
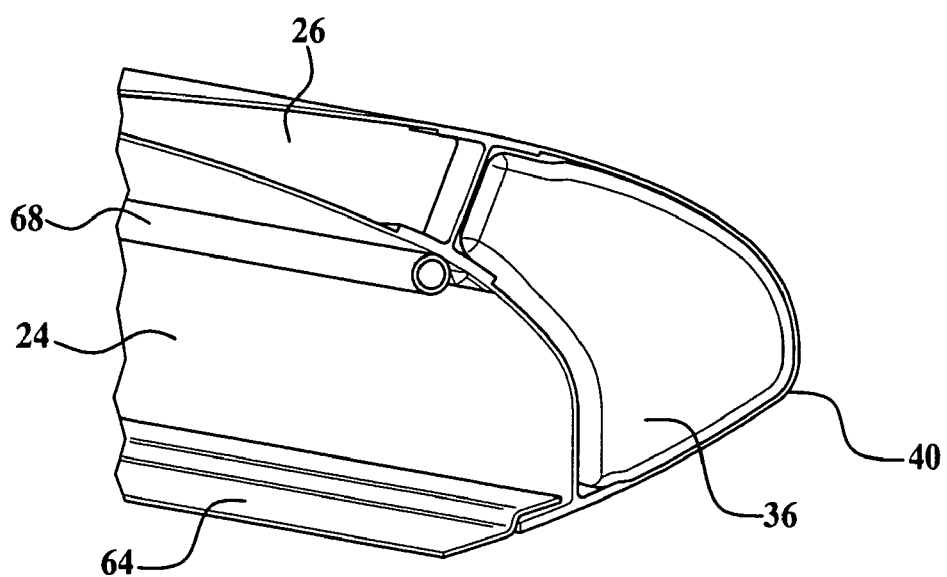
FIG. 17 is an enlarged, fragmentary view of one end of the slat, portions being broken away in section.

The ribs 32 are secured to the forward section of the lower skin 24 by means of screws, rivets or other fasteners, and as previously mentioned, the nose skin 40 is secured by countersunk bolts to a nutplate (not shown) carried on the co-cured subassembly 45. As best seen in FIGS. 9, 10 and 17 the upper trailing edge of the nose skin 40 is received within a notch 66 defined by the forward edge of upper skin 22 and the upper leg 28a of the spar 28. The notch 66 allows the outer surfaces of nose skin 40 and upper skin 22 to form a flush, continuous surface in order to reduce turbulence. An end rib 36 (FIGS. 14 and 17) seals the outer end of the nose skin 40. As shown in FIG. 17, an upper, spanwise bulb seal 68, and a lower, spanwise flex skirt 64 are attached to the rear of the slat 20 and function to seal the spar 20 against the fixed leading edge of a wing (not shown) when the slat 20 is in its stowed position during normal flight.

Although this invention has been described with respect to certain exemplary embodiments, it is to be understood that the specific embodiments are for purposes of illustration and not limitation, as other variations will occur to those of skill in the art.

What is claimed is:

1. A wing slat for aircraft, comprising:
   an upper, composite skin comprising an upper skin forward edge;

a lower composite skin wherein the lower skin comprises a downwardly curved forward edge extending forwardly beyond the upper skin forward edge;

a central, honeycomb core section sandwiched between the upper and lower skins; and, a composite nose skin forming the leading edge of the slat and extending between forward edges of the upper and lower skins.

2. The wing slat of claim 1, wherein the upper skin and central core section are each tapered.

3. The wing slat of claim 1, further comprising a composite spar at the forward end of the central core section and disposed between upper and lower skins.

4. The wing slat of claim 3, wherein the spar has a generally C-shaped cross section.

5. The wing slat of claim 3, wherein the spar include first, second and third legs respectively bonded to the upper skin, the central core section and the lower skin.

6. The wing slat of claim 1, further comprising a plurality of stiffeners secured to the lower skin, the stiffeners being spaced along the length of the slat and extending in a fore-to-aft direction.

7. The wing slat of claim 6, wherein the stiffeners are bonded to the curved forward edge of the lower skin.

8. A composite slat for an aircraft wing, comprising:

an upper composite skin comprising an upper skin forward edge;

a central, wedge shaped composite core;

a lower composite skin having a downwardly curved forward edge extending forwardly beyond the upper skin forward edge;

a spar between the upper and lower skins, and disposed forward of the central core;

composite stiffeners bonded to the curved forward edge of the lower skin; and, a composite nose skin forming the leading edge of the slat and extending between forward edges of the upper and lower skins.

9. The composite slat of claim 8, wherein the spar is bonded to the upper skin, the lower skin and the central core.

10. The composite slat of claim 8, wherein the central core is wedge shape in cross section.

11. The composite slat of claim 8, wherein the stiffeners are curved and spaced apart along the length of the slat.

12. The composite slat of claim 8, wherein the lower skin extends forwardly beyond the central core, and the stiffeners are disposed between the forward edge of the central core and the forward edge of the lower skin.

13. The composite slat of claim 8, further comprising a plurality of ribs bearing against the lower skin and covered by the nose skin.

14. The composite slat of claim 8, wherein:

the spar includes an upper leading edge, and the nose skin includes a trailing edge covering and secured to the leading edge of the spar.

15. A wing slat for aircraft, comprising:

an upper, composite skin comprising an upper skin forward edge;

a lower composite skin wherein the lower skin comprises a downwardly curved forward edge extending forwardly beyond the upper skin forward edge;

a central, honeycomb core section sandwiched between the upper and lower skins;

a composite spar at the forward end of the central core section and disposed between upper and lower skins and, a composite nose skin forming the leading edge of the slat and extending between forward edges of the upper and lower skins.

16. The wing slat of claim 15, wherein the upper skin and the central core section are each tapered.

17. The wing slat of claim 15, wherein the spar has a generally C-shaped cross section.

18. The wing slat of claim 17, wherein the spar include first, second and third legs respectively bonded to the upper skin, the central core section and the lower skin.

19. The wing slat of claim 15, further comprising a plurality of stiffeners secured to the lower skin, the stiffeners being spaced along the length of the slat and extending in a fore-to-aft direction.

20. The wing slat of claim 19, wherein the stiffeners are bonded to the curved forward edge of the lower skin.

21. The wing slat of claim 15, wherein:

the spar includes an upper leading edge, and the nose skin includes a trailing edge covering and secured to the leading edge of the spar.

22. The wing slat of claim 15, further comprising a plurality of ribs bearing against the lower skin and covered by the nose skin.

* * * * *